United States Patent Office 2,790,821
Patented Apr. 30, 1957

2,790,821

CYANOETHYLATION OF HYDROGEN SULFIDE

Glen E. Journeay, Texas City, Tex., assignor to Monsanto Chemical Company, St. Louis, Mo., a corporation of Delaware No Drawing. Application July 16, 1956,
Serial No. 597,883

5 Claims. (Cl. 260—465.8)

The present invention relates to a process for the cyanoethylation of hydrogen sulfide.

It has now been found in accordance with this invention that hydrogen sulfide will react with $\beta,\beta'$-oxydipropionitrile in the presence of a strongly alkaline catalyst to yield $\beta,\beta'$-thiodipropionitrile. By the reaction, the reactive hydrogens of the inorganic sulfhydryl compound are replaced by the cyanoethyl group or, in other words, the hydrogen sulfide is cyanoethylated. The organic sulfur compound thus produced has many uses both as a chemical intermediate in the preparation of plasticizers, preservatives, wetting agents, and the like and is especially useful as a selective solvent.

The strongly alkaline catalysts which are effective for promoting the reaction are the oxides, hydroxides, carbonates, phosphates, cyanides, amides and alcoholates of the alkali metals or the alkali metals themselves. Included in this category are, for example, sodium hydroxide, potassium hydroxide, lithium hydroxide, sodium oxide, sodamide, potassium ethylate, sodium cyanide, potassium carbonate, potassium tertiary amylate, and the like. Also suitable are the strongly basic non-metallic hydroxides such as the quaternary ammonium hydroxides among which may be mentioned trimethylbenzylammonium hydroxide (available commercially under the trade name "Triton B"), benzyltriethylammonium hydroxide, dimethyldibenzylammonium hydroxide, and the like.

The quantity of alkaline catalyst required is relatively small, amounts in the range from about 0.1% to about 20% of the combined weights of the reactants being required. In practice, amounts ranging from about 1% to about 10% are preferred.

The reaction is carried out most conveniently by simply adding the $\beta,\beta'$-oxydipropionitrile to an alkaline solution of aqueous hydrogen sulfide or by charging all the reactants simultaneously to a suitable reactor. Since neither the order of addition of the reactants nor the stage at which the catalyst is introduced is critical, good results may also be obtained by adding the alkaline catalyst to a mixture of the reagents or by adding both reactants to a medium containing the catalyst. In the latter case, the medium may be an inert solvent such as dioxane, benzene, petroleum ether, tert.-butyl alcohol, or like material.

The cyanoethylation of hydrogen sulfide takes place readily at any temperature in the range from about 0° C. to about 150° C. Preferably, the temperature is maintained in the range from about 25° C. to about 100° C. Atmospheric pressure is usually employed but superatmospheric pressure may be employed if desired. For example, the reaction may be carried out in a rocking autoclave containing liquid hydrogen sulfide to which the $\beta,\beta'$-oxydipropionitrile and catalyst are charged. The mixture is then heated and allowed to react at autogenous pressure.

Stoichiometric quantities of the reactants are satisfactory but excesses of either reactant may be employed. For example, when working under pressure as mentioned above, a large excess of hydrogen sulfide, about 5 moles to each mole of $\beta,\beta'$-oxydipropionitrile, can be employed and the unreacted sulfide can be vented at the end of the reaction period leaving the product as residue. The latter can then be purified by recrystallization. When working in aqueous medium or in a solvent medium, an excess of $\beta,\beta'$-oxydipropionitrile is preferably employed. The preferred mole ratio of $\beta,\beta'$-oxydipropionitrile to hydrogen sulfide in this case is in the range from 2:1 to 5:1.

The following examples are given to illustrate how the present invention may be carried out in practice but they are not intended to limit the scope of the invention in any manner. All parts given are by weight.

*Example 1*

A mixture of about 500 parts of $\beta,\beta'$-oxydipropionitrile, 34 parts of aqueous hydrogen sulfide and 10 parts of sodium hydroxide are charged to a reactor of suitable capacity and heated to a temperature of about 80° C. for a period of about 2–3 hours while the mixture is continuously stirred. The reaction mixture is distilled under vacuum (5 mm. of Hg) to remove the water present. The residue is dissolved in hot alcohol. Upon cooling this alcohol solution $\beta,\beta'$-thiodipropionitrile is precipitated.

*Example 2*

A mixture of 250 parts of $\beta,\beta'$-oxydipropionitrile, 17 parts of hydrogen sulfide, 21 parts of sodamide, and 125 parts of butanol are heated for several hours at 80° C. in a pressure-tight reaction vessel such as a rocker-type bomb, for example. By flash distillation of the resulting mixture, the solvent and unreacted $\beta,\beta'$-oxydipropionitrile are removed and the $\beta,\beta'$-thiodipropionitrile is recovered and purified by successive crystallizations from a suitable solvent such as chloroform, for example.

This application is a continuation-in-part of my copending application Serial No. 458,021 filed September 23, 1954.

What is claimed is:

1. A process for cyanoethylating hydrogen sulfide which comprises reacting hydrogen sulfide with $\beta,\beta'$-oxydipropionitrile in the presence of a strongly alkaline catalyst.

2. A process for cyanoethylating hydrogen sulfide which comprises reacting hydrogen sulfide with $\beta,\beta'$-oxydipropionitrile in the presence of a strongly alkaline catalyst at a temperature in the range from about 0° C. to about 150° C.

3. A process for cyanoethylating hydrogen sulfide which comprises reacting hydrogen sulfide with $\beta,\beta'$-oxydipropionitrile in the presence of a strongly alkaline catalyst at a temperature in the range from about 25° C. to about 100° C.

4. The process of claim 2 wherein said strongly alkaline catalyst is the hydroxide of an alkali metal.

5. The process of claim 3 wherein said strongly alkaline catalyst is sodium hydroxide.

References Cited in the file of this patent
UNITED STATES PATENTS 2,748,155   Wordie ---------------- May 29, 1956